US008976176B2

(12) United States Patent
Rhee et al.

(10) Patent No.: US 8,976,176 B2
(45) Date of Patent: Mar. 10, 2015

(54) APPARATUS AND METHOD FOR REALISTICALLY EXPRESSING TEETH

(75) Inventors: Tae Hyun Rhee, Yongin-si (KR); Seon Min Rhee, Seoul (KR); Hyun Jung Shim, Seoul (KR); Do Kyoon Kim, Seongnam-si (KR); Abhijeet Ghosh, Los Angeles, CA (US); Jay Busch, Los Angeles, CA (US); Matt Chiang, Los Angeles, CA (US); Paul Debevec, Los Angeles, CA (US)

(73) Assignees: Samsung Electronics Co., Ltd., Suwon-si (KR); University of Southern California, Los Angeles, CA (US)

( * ) Notice: Subject to any disclaimer, the term of this patent is extended or adjusted under 35 U.S.C. 154(b) by 300 days.

(21) Appl. No.: 13/369,703

(22) Filed: Feb. 9, 2012

(65) Prior Publication Data

US 2012/0287130 A1 Nov. 15, 2012

Related U.S. Application Data

(60) Provisional application No. 61/441,059, filed on Feb. 9, 2011.

(30) Foreign Application Priority Data

Apr. 13, 2011 (KR) ........................ 10-2011-0034232

(51) Int. Cl.
*G06T 15/50* (2011.01)
(52) U.S. Cl.
CPC ............ *G06T 15/50* (2013.01); *G06T 2210/41* (2013.01)

USPC .......................................................... 345/426
(58) Field of Classification Search
CPC ........................... G06T 15/50; G06T 2210/41
See application file for complete search history.

(56) References Cited

U.S. PATENT DOCUMENTS

| 6,099,314 A | 8/2000 | Kopelman et al. |
| 7,373,286 B2 | 5/2008 | Nikolskiy et al. |
| 8,217,940 B2 * | 7/2012 | Burley et al. ................. 345/426 |
| 2006/0281041 A1 | 12/2006 | Rubbert et al. |
| 2009/0123045 A1 * | 5/2009 | Quadling et al. ............ 382/128 |
| 2010/0169057 A1 | 7/2010 | Hultgren et al. |

FOREIGN PATENT DOCUMENTS

| KR | 10-2004-0001698 | 1/2004 |
| KR | 10-2005-0066501 | 6/2005 |

OTHER PUBLICATIONS

Wan-Chun Ma et al., Rapid Acquisition of Specular and Diffuse Normal Maps from Polarized Spherical Gradient Illumination, Eurographics Symposium on Rendering (2007), pp. 183-194.*

* cited by examiner

*Primary Examiner* — Kee M Tung
*Assistant Examiner* — Frank Chen
(74) *Attorney, Agent, or Firm* — NSIP Law

(57) ABSTRACT

A method and apparatus for realistically expressing teeth performs rendering on a shape model of the teeth using a hybrid normal map based on materials and characteristics of the teeth in order to more realistically express the teeth.

18 Claims, 11 Drawing Sheets

US 8,976,176 B2

APPARATUS AND METHOD FOR REALISTICALLY EXPRESSING TEETH

CROSS-REFERENCE TO RELATED APPLICATIONS

This application claims the priority benefit of U.S. Provisional Application No. 61/441,059, filed on Feb. 9, 2011, in the United States Patent and Trademark Office, and Korean Patent Application No. 10-2011-0034232, filed on Apr. 13, 2011, in the Korean Intellectual Property Office, the disclosures of which are incorporated herein by reference.

BACKGROUND

1. Field

Example embodiments of the following description provide a method and apparatus for realistically expressing teeth.

2. Description of the Related Art

Realistic human modeling and animation are key elements in technologies required for film production, games, medical simulation, and other applications that use computer graphics (CG). Accordingly, what is most important is to realistically express a human face.

As shown in FIG. 1, a tooth of a face is one of complex components of a human body, and includes a plurality of layers. As shown in FIG. 2, light may be refracted and reflected in different directions for each layer of a tooth.

Accordingly, to realistically express features of a face, a rendering algorithm based on the material characteristics of teeth needs to be applied, independently of an algorithm for rendering the remainder of the face. However, very few attempts have been made to perform realistic rendering based on the material characteristics of teeth by treating teeth as a separate component. Thus, there is a desire for a modeling and rendering method that may more realistically express teeth based on the material characteristics of teeth.

SUMMARY

The foregoing and/or other aspects are achieved by providing a method for realistically expressing a set of teeth, including acquiring a shape model of the teeth, generating a hybrid normal map using a virtual light stage, where the hybrid normal map is used to represent materials and characteristics of the teeth, and where the virtual light stage is used to represent optical characteristics on the shape model, and performing a rendering on the shape model based on the generated hybrid normal map.

The method may further include acquiring a texture map for the teeth. The acquiring of the texture map may include acquiring a texture map for an upper part of the set of teeth, and a texture map for a lower part of the set of teeth. The acquiring of the texture map may further include acquiring a texture map for a gum adjacent to the teeth.

The generating of the hybrid normal map may include generating a diffuse normal map using the virtual light stage, where the diffuse normal map is used to represent a diffuse reflection occurring in the shape model, generating a specular normal map using the virtual light stage, where the specular normal map is used to represent a specular reflection occurring in the shape model, and generating a hybrid normal map for the shape model, using the generated diffuse normal map and the generated specular normal map.

The generating of the diffuse normal map may include generating diffuse normal maps for each red, green, and blue (RGB) channel using the virtual light stage.

The generating of the hybrid normal map may include generating the hybrid normal map using a gradient illumination light pattern, where the light pattern is adjusted in the virtual light stage.

The foregoing and/or other aspects are achieved by providing an apparatus for realistically expressing a set of teeth, including a shape model acquiring module to acquire a shape model of the teeth, a map generating module to generate a hybrid normal map using a virtual light stage, where the hybrid normal map is used to represent materials and characteristics of the teeth, and where the virtual light stage is used to represent optical characteristics on the shape model, and a rendering module to perform a rendering on the shape model based on the generated hybrid normal map.

The apparatus may further include a texture map acquiring module to acquire a texture map for the teeth. The texture map acquiring module may acquire a texture map for an upper part of the set of teeth and a texture map for a lower part of the set of teeth. The texture map acquiring module may acquire a texture map for a gum adjacent to the teeth.

The map generating module may include a diffuse normal map generator to generate a diffuse normal map using the virtual light stage, where the diffuse normal map is used to represent a diffuse reflection occurring in the shape model, a specular normal map generator to generate a specular normal map using the virtual light stage, where the specular normal map is used to represent a specular reflection occurring in the shape model, and a hybrid normal map generator to generate a hybrid normal map for the shape model, using the generated diffuse normal map and the generated specular normal map.

The diffuse normal map generator may generate diffuse normal maps for each RGB channel using the virtual light stage.

The map generating module may generate the hybrid normal map using a gradient illumination light pattern, where the light pattern is adjusted in the virtual light stage.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
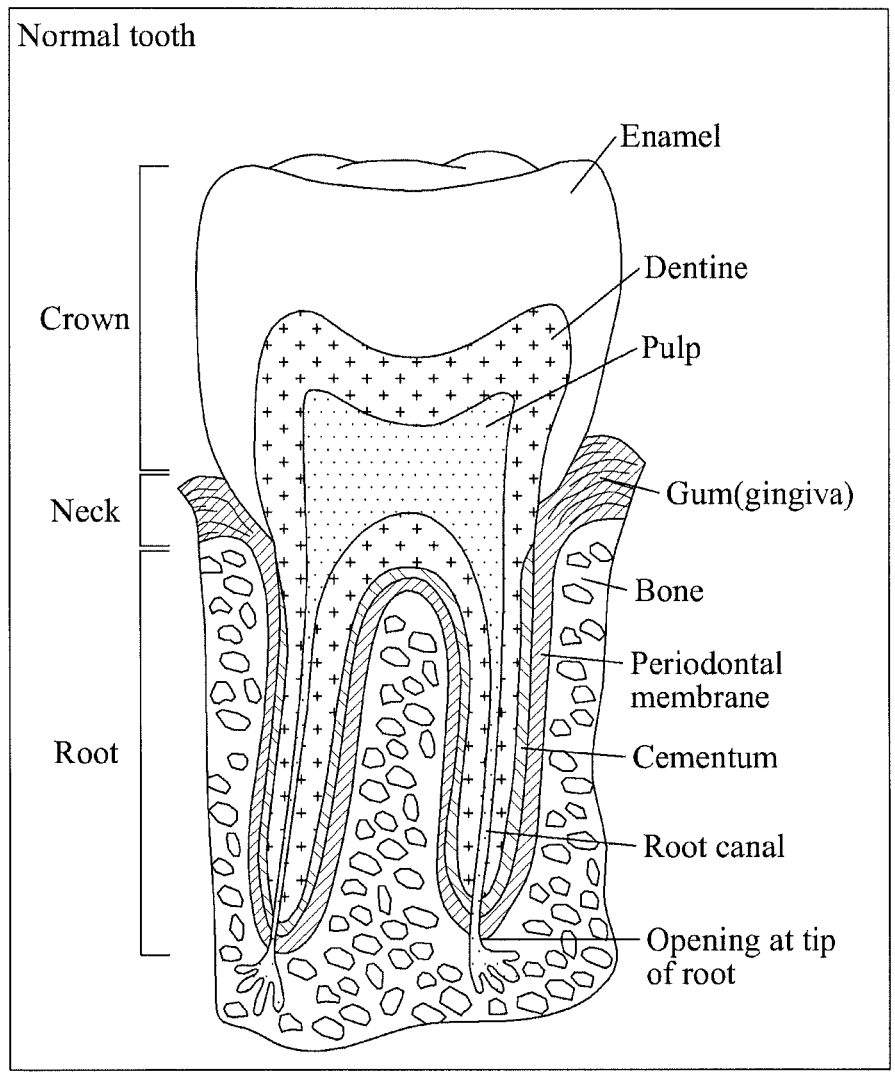
FIG. 1 illustrates a diagram of a configuration of a tooth according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a diagram of a configuration of a tooth according to example embodiments.

Referring to FIG. 1, the tooth is typically divided into three parts, for example, a crown, a neck, and a root. Additionally, an outermost part of the tooth is referred to as the enamel. The enamel covers the tooth, and is the hardest part of the tooth. Additionally, the enamel has strength similar to that of a crystal, and contains 96% mineral content.

A dentine is a major component of the tooth, is similar to a bone, and forms most parts of the tooth. The dentine functions to absorb a shock when an external stimulus is applied.

A pulp, commonly called a nerve, contains nervous tissues and blood vessels, and functions to provide blood and nutrition to the tooth. Since nervous tissues are contained in the pulp, the pulp causes pain when a strong external stimulus is applied.

A gum or gingiva functions to protect the tooth and an alveolar bone. In other words, the gum may cover the alveolar bone to protect the tooth. The alveolar bone refers to a bone bearing the tooth. A periodontal ligament or a periodontal membrane functions to connect the tooth to the alveolar bone. A cementum functions to enable the tooth to be attached to the alveolar bone. The cementum contains about 50% inorganic material, and covers the root of the tooth. The tooth further includes a root canal, and an opening at a tip of the root.

Figure 2:
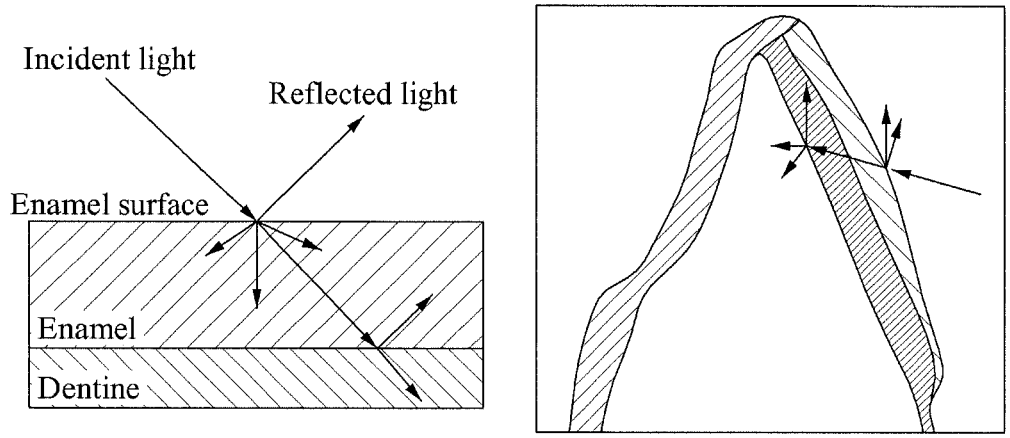
FIG. 2 illustrates a diagram of refraction and reflection of light for each layer of a tooth according to example embodiments.

FIG. 2 illustrates a diagram of the refraction and reflection of light for each layer of a tooth according to example embodiments.

Referring to FIG. 2, light may be refracted and reflected in different directions, depending on where the light is incident For example, light may be incident to the surface of the enamel, or to the dentine.

Figure 3:
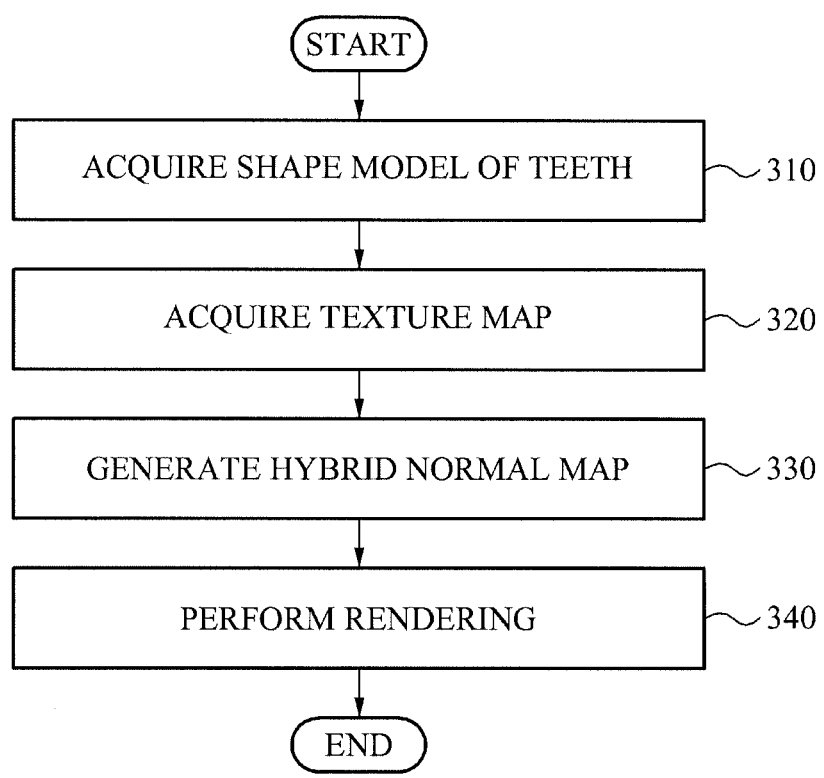
FIG. 3 illustrates a flowchart of a method of realistically expressing teeth according to example embodiments.

FIG. 3 illustrates a flowchart of a method of realistically expressing teeth according to example embodiments.

Figure 5:
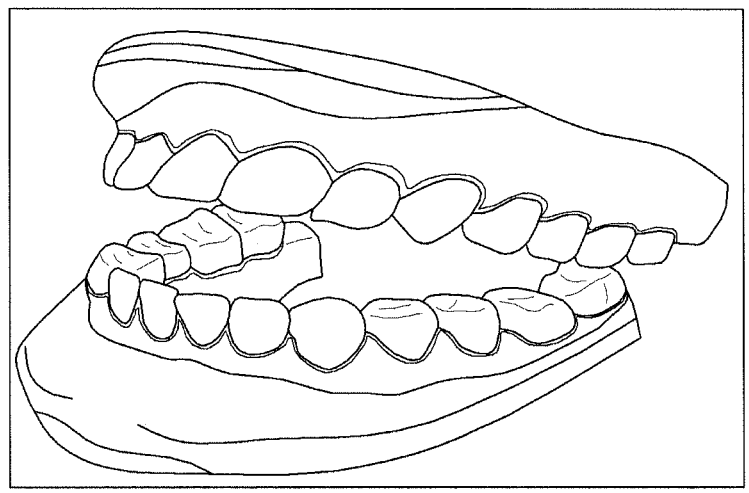
FIG. 5 illustrates a diagram of the shape model of the teeth generated based on the cast of FIG. 4.

Referring to FIG. 3, in operation 310, an apparatus for realistically expressing teeth (hereinafter, referred to as an "apparatus") may acquire a shape model of the teeth. To acquire the shape model in operation 310, the apparatus may make a cast of the teeth, and may perform modeling of the cast. Subsequently, the apparatus may acquire a shape model as shown in FIG. 5, using the cast.

Figure 6:
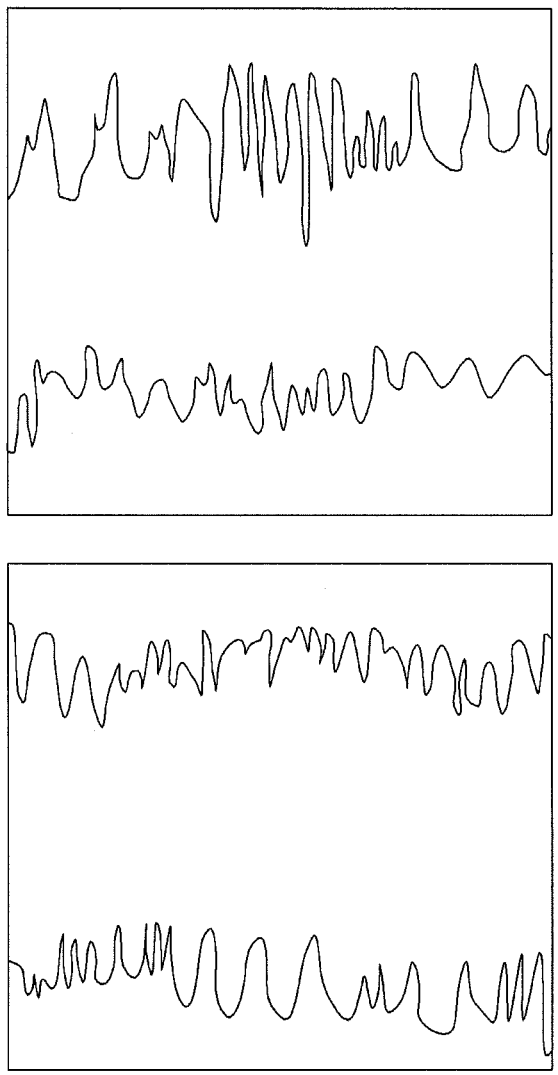
FIG. 6 illustrates diagrams of texture maps for an upper part and a lower part of a set of teeth according to example embodiments.

In operation 320, the apparatus may acquire a texture map for the teeth. The apparatus may acquire a texture map for an upper part of the set of teeth, and a texture map for a lower part of the set of teeth, as shown in FIG. 6. Here, the apparatus may also acquire a texture map for a gum adjacent to the teeth, to represent the gum. To acquire a texture map, the apparatus may employ various algorithms that are frequently used in corresponding fields.

In operation 330, the apparatus may generate a hybrid normal map using a virtual light stage. The hybrid normal map may be used to represent materials and characteristics of the teeth, and the virtual light stage may be used to represent optical characteristics on the shape model. The virtual light stage will be described later with reference to FIGS. 9 and 10.

Figure 10:
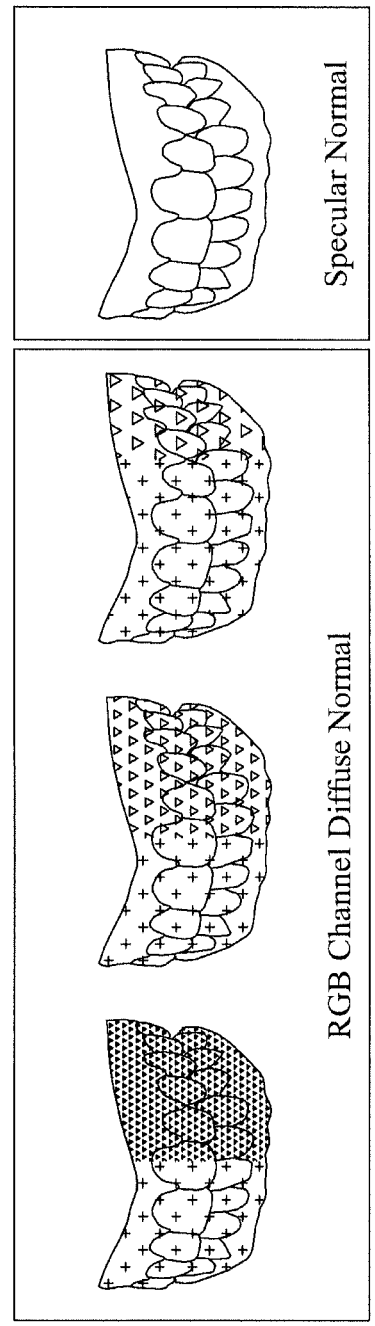
FIG. 10 illustrates a diagram to explain a specular normal map, and diffuse normal maps for each RGB channel that are acquired using a virtual light stage according to example embodiments.

The hybrid normal map may be generated using the following scheme:

First, a diffuse normal map for the shape model of the teeth may be generated using the virtual light stage. The diffuse normal map may be used to represent an effect of a diffuse reflection occurring in the shape model, such as an effect in which each part of the teeth appears cloudy with different transparency levels (namely, an effect of enabling the teeth to appear opaque), for example. Additionally, diffuse normal maps may be generated for each RGB channel using the virtual light stage, as shown in FIG. 10.

Subsequently, a specular normal map for the shape model may be generated using the virtual light stage. The specular normal map may be used to represent an effect of a specular reflection occurring in the shape model, such as an effect of teeth glittering due to water or saliva, for example.

After the diffuse normal map and the specular normal map are generated, a hybrid normal map for the shape model may be generated using the diffuse normal map and the specular normal map. Additionally, the apparatus may generate a hybrid normal map using a gradient illumination light pattern, where the light pattern is adjusted in the virtual light stage. In operation 340, the apparatus may perform rendering on the shape model based on the hybrid normal map.

Figure 4:
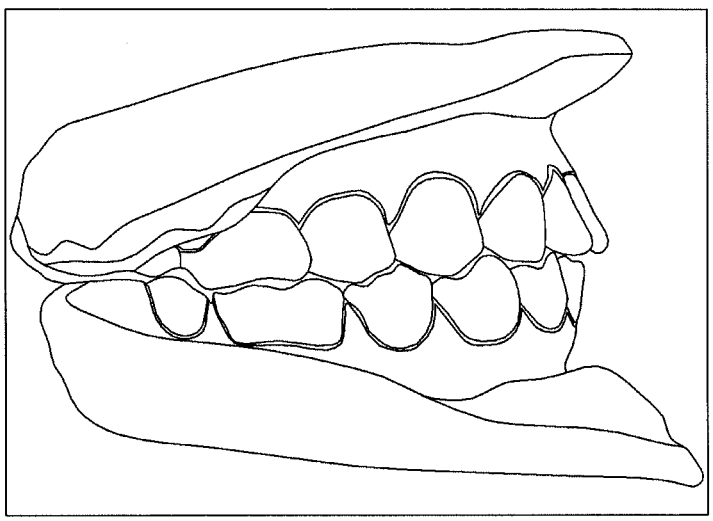
FIG. 4 illustrates a diagram of a cast generated to acquire a shape model of teeth according to example embodiments.

FIG. 4 illustrates a diagram of a cast generated to acquire a shape model of teeth according to example embodiments.

FIG. 5 illustrates a diagram of the shape model of the teeth generated based on the cast of FIG. 4.

FIG. 6 illustrates diagrams of texture maps for an upper part and a lower part of a set of teeth according to example embodiments.

Figure 7:
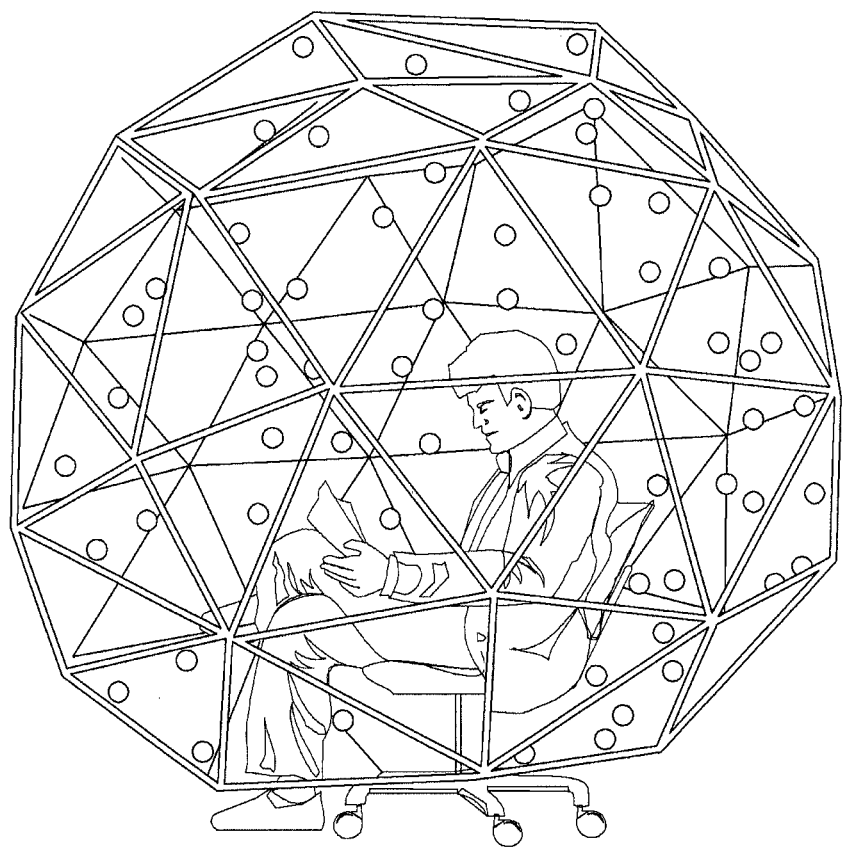
FIG. 7 illustrates a diagram to explain a conventional light stage.

FIG. 7 illustrates a diagram of a conventional light stage.

A virtual light stage may be obtained by virtualizing the light stage of FIG. 7. As shown in FIG. 7, the light stage has a structure in which programmable Light Emitting Diode (LED) lights are installed closely together in a dome-shaped frame. The light stage may provide various light effects by individually adjusting the LED lights. In the example embodiments, a virtual light stage exhibiting a similar effect to the light stage in a virtual manner may be used.

Figure 8:
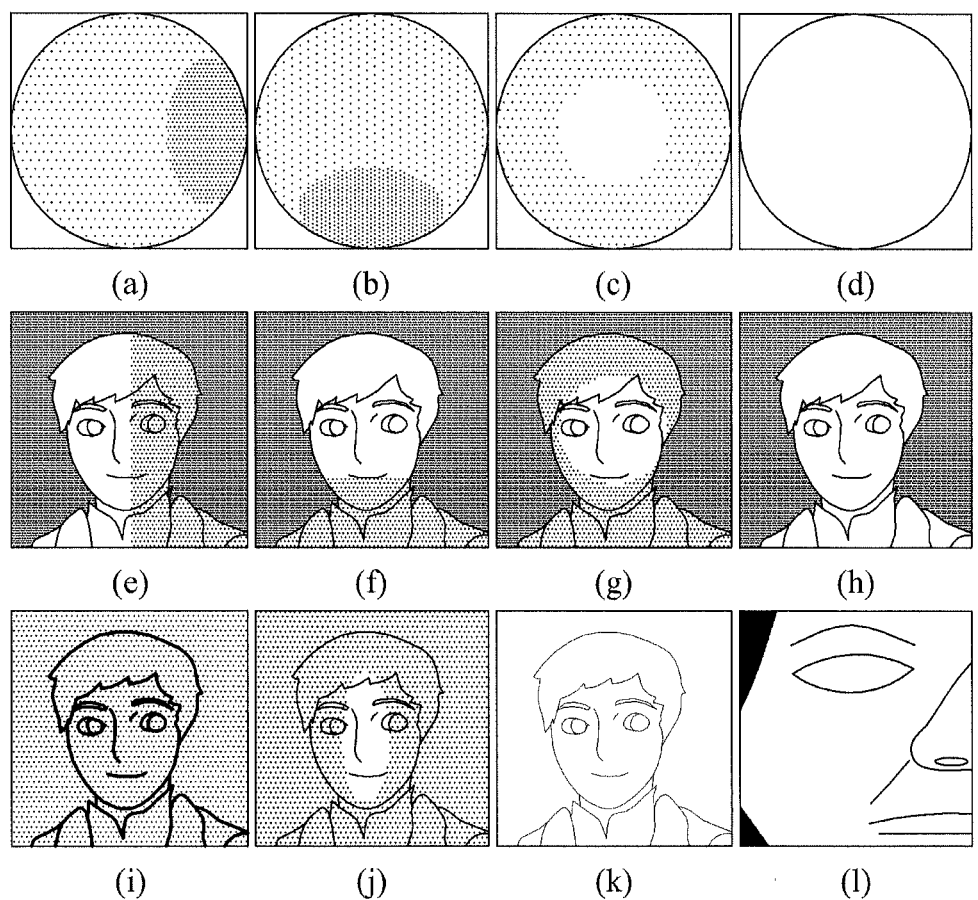
FIG. 8 illustrates a diagram to explain a diffuse normal map and a specular normal map generated based on light patterns of the light stage of FIG. 7.

FIG. 8 illustrates a diagram to explain a diffuse normal map and a specular normal map generated based on light patterns of the light stage of the FIG. 7.

In FIG. 8, images (a) through (d) respectively represent the light patterns in the light stage, and images (e) through (h) represent objects actually reflected in the light stage based on the above-described light patterns. Additionally, images (i) through (k) respectively represent diffuse normal maps for each RGB channel in the light stage, and an image (I) represents a specular normal map in the light stage.

FIG. 8 illustrates how to differently reflect light from an object (for example, a man) and represent how the object may be captured by a camera, by changing light patterns in the light stage. Here, images acquired by the capture may include complex lighting effects such as interreflection, occlusion, and subsurface scattering, for example.

Accordingly, when the images are used, it is possible to separately acquire a diffuse normal map and a specular normal map that are respectively required to represent diffuse reflection and specular reflection for the object. The rendering of the shape model based on the hybrid normal map refers to a scheme of separating the diffuse normal map and the specular normal map and using the separated diffuse normal map and specular normal map to perform the rendering, as described above.

In example embodiments, a virtual light stage for ensuring a hybrid normal map for a virtual model may be used based on the same principle as the light stage. In the virtual light stage, a lighting effect in the light stage may be reproduced using rendering software. Based on the same principle as the light stage, the virtual light stage may enable complex lighting effects occurring in an real object to appear on a virtual model, and may enable a hybrid normal map to be generated based on a result of the rendering.

Figure 9:
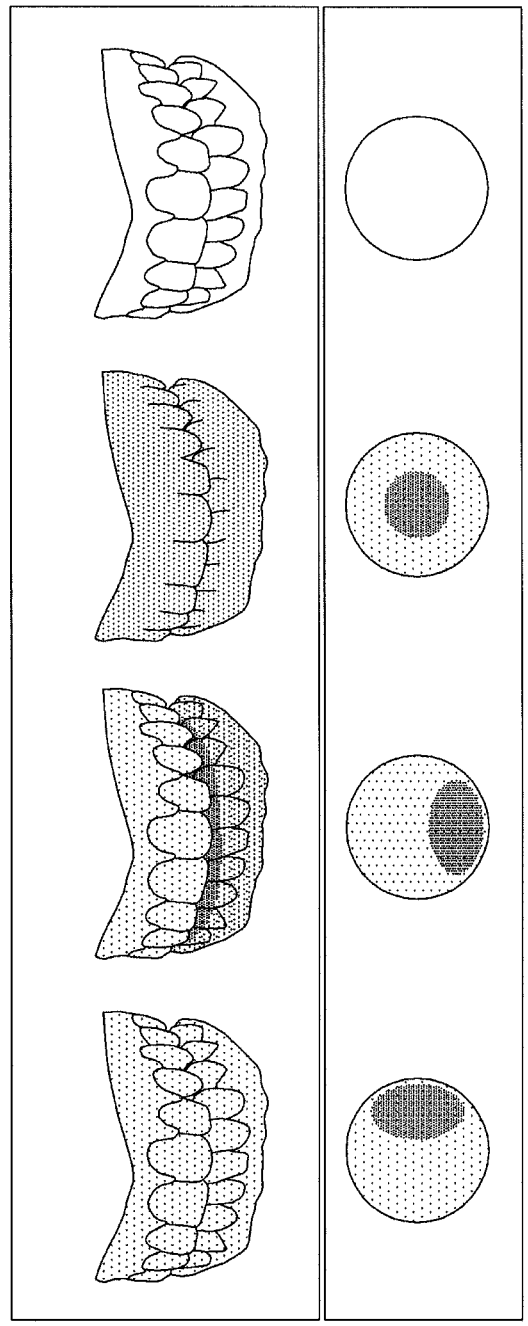
FIG. 9 illustrates a diagram of results of performing rendering on teeth based on light patterns of a virtual light stage according to example embodiments.

FIG. 9 illustrates a diagram of results of performing rendering on teeth based on light patterns of a virtual light stage according to example embodiments.

The results may include complex materials and characteristics of the teeth that are encoded, such as occlusion, interreflection, or subsurface scattering, for example. Accordingly, the complex materials and characteristics of the teeth that are acquired are reflected on a diffuse normal map and a specular normal map. The rendering of the teeth may be performed, in real time, based on a hybrid normal map using the diffuse normal map and specular normal map. Here, the diffuse normal map may be used to represent a diffuse reflection, and the specular normal map may be used to represent a specular reflection.

A Phong shading model may be explained based on the above-described hybrid normal map, as given in the following Equation 1:

$$I_p = k_a i_a + \sum_{m \in lights} (k_d (L_m \cdot N) i_d + k_s (R_m \cdot V)^\alpha i_s)$$ [Equation 1]

In Equation 1, $I_p$ denotes a shading value of an object surface point, $k_a$ denotes an ambient reflection constant, and $i_a$ denotes an intensity of ambient light. Additionally, m denotes a number of lights, $L_m$ denotes a direction vector of light m, N denotes a surface normal vector, and V denotes a gaze direction. Furthermore, $k_d$ denotes a diffuse reflection constant, $i_d$ denotes an intensity of diffuse light, $k_s$ denotes a specular reflection constant, $i_s$ denotes an intensity of specular light, and $\alpha$ denotes a shininess. In Equation 1, "$k_d(L_m \cdot N) i_d$" represents diffuse reflection, and "$k_s(R_m \cdot V)^\alpha i_s$" represents specular reflection. $R_m$ is defined by Equation 2 below:

$$R_m = 2(L_m \cdot N) N - L_m.$$ [Equation 2]

The virtual light stage compared with the light stage has the following characteristics:

With the virtual light stage, there is no physical limitation on a size of a target object. The light stage may be used only for an object that is able to fit in a frame. However, in the virtual light stage, the size of an object may be adjusted and thus, it is possible to apply the object to a model regardless of the size of the model.

In the virtual light stage, "rendering" of a model reflected by light may be performed, instead of "capturing" the model by an actual camera. Accordingly, it is possible to adjust the size of a normal map to be a desired size.

In the virtual light stage, a diffuse normal map and a specular normal map may be separated from each other using software. In the light stage, polarization may be used to separate the diffuse reflection and the specular reflection, while in the virtual light stage, it is possible to easily separate the diffuse reflection and the specular reflection by adjusting a rendering parameter.

In the virtual light stage, it is possible to finely adjust a light pattern. In the light stage, a more accurate gradient illumination light pattern may be reproduced by adjusting LED lights that are discretely disposed.

The virtual light stage may be used to represent, in real time, an algorithm for expressing teeth, as well as an algorithm for expressing complex optical characteristics that require a long period of time for rendering. In other words, a diffuse normal map and a specular normal map may be generated using a result of rendering a virtual model by an algorithm for expressing optical characteristics on the gradient illumination light pattern of the virtual light stage.

Here, since the complex optical characteristics to be expressed by the algorithm are already reflected on the generated diffuse normal map and the generated specular normal map, an effect similar to that of an expensive rendering algorithm may appear in real time when rendering is performed on a hybrid normal map generated using the diffuse normal map and the specular normal map.

FIG. 10 illustrates a diagram to explain a specular normal map, and diffuse normal maps for each RGB channel that are acquired using a virtual light stage according to example embodiments.

Figure 11:
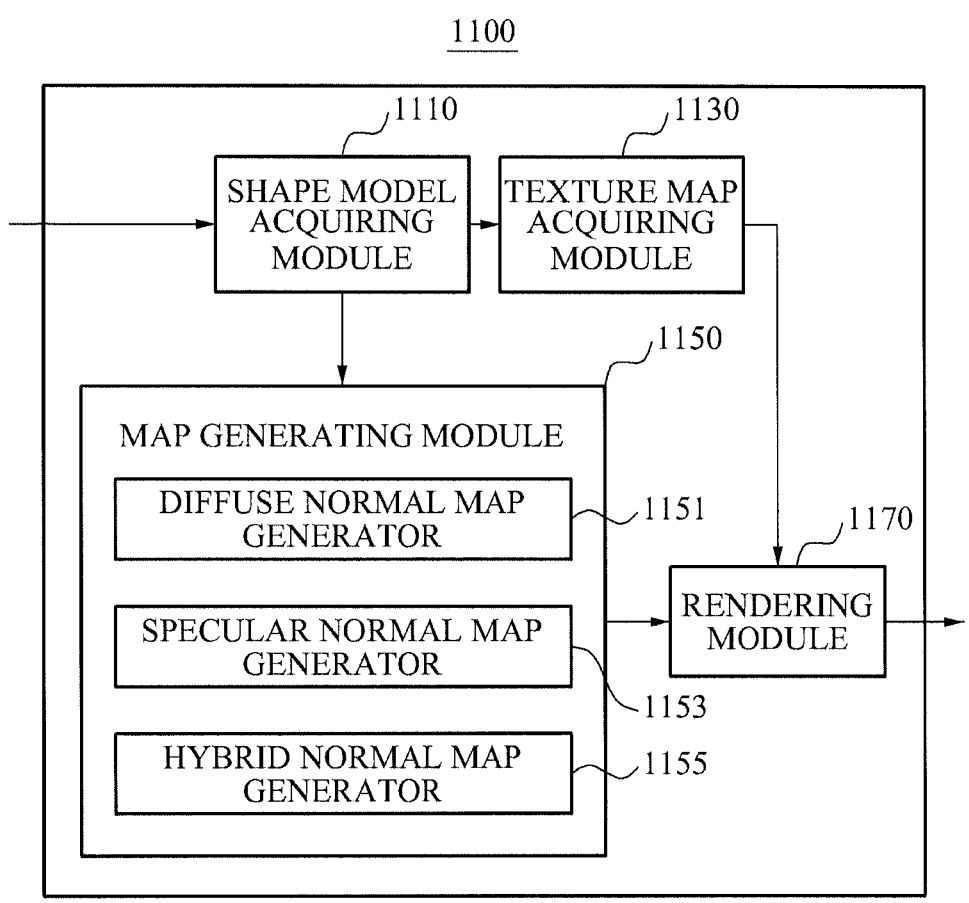
FIG. 11 illustrates a block diagram of an apparatus for realistically expressing teeth according to example embodiments.

FIG. 11 illustrates a block diagram of an apparatus 1100 for realistically expressing teeth according to example embodiments.

Referring to FIG. 11, the apparatus 1100 may include a shape model acquiring module 1110, a texture map acquiring module 1130, a map generating module 1150, and a rendering module 1170. The shape model acquiring module 1110 may acquire a shape model of teeth. The texture map acquiring module 1130 may acquire a texture map for the teeth. The texture map acquiring module 1130 may acquire a texture map for an upper part of the set of teeth, and a texture map for a lower part of the set of teeth. Additionally, the texture map acquiring module 1130 may acquire a texture map for a gum adjacent to the teeth.

The map generating module 1150 may generate a hybrid normal map using a virtual light stage. Here, the hybrid normal map may be used to represent materials and characteristics of the teeth. The virtual light stage may be used to represent optical characteristics on the shape model. The map generating module 1150 may include a diffuse normal map generator 1151, a specular normal map generator 1153, and a hybrid normal map generator 1155.

The diffuse normal map generator 1151 may generate a diffuse normal map using the virtual light stage. Here, the diffuse normal map may be used to represent a diffuse reflection occurring in the shape model of the teeth. Additionally, the diffuse normal map generator 1151 may generate diffuse normal maps for each RGB channel using the virtual light stage.

The specular normal map generator 1153 may generate a specular normal map using the virtual light stage. Here, the specular normal map may be used to represent a specular reflection occurring in the shape model of the teeth.

The hybrid normal map generator 1155 may generate a hybrid normal map for the shape model, using the diffuse normal map and the specular normal map.

Additionally, the map generating module 1150 may generate a hybrid normal map using a gradient illumination light pattern, where the light pattern is adjusted in the virtual light stage.

The rendering module 1170 may perform rendering on the shape model based on the hybrid normal map.

According to example embodiments, it is possible to realistically express translucent properties of teeth, shadows between the teeth, or a change in light, for example, by using a hybrid normal map for representing materials and characteristics of the teeth.

Additionally, according to example embodiments, it is possible to more realistically express teeth using a hybrid normal map, and a virtual light stage for representing optical characteristics on a shape model of the teeth. Thus, the example embodiments may be applied to such application as a medical simulation or a dental training system, for example.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method for realistically expressing a set of teeth, the method comprising:
   acquiring a shape model of the teeth;
   generating a hybrid normal map adjusting a light pattern in a virtual light stage, wherein the hybrid normal map is used to represent materials and characteristics of the teeth, and wherein the virtual light stage is used to represent optical characteristics on the shape model; and
   performing a rendering on the shape model based on the generated hybrid normal map,
   wherein the generating of the hybrid normal map comprises:
   generating a diffuse normal map using the virtual light stage, wherein the diffuse normal map is used to represent a diffuse reflection occurring in the shape model;
   generating a specular normal map using the virtual light stage, wherein the specular normal map is used to represent a specular reflection occurring in the shape model; and
   generating a hybrid normal map for the shape model, using the generated diffuse normal map and the generated specular normal map.

2. The method of claim 1, further comprising:
   acquiring a texture map for the teeth.

3. The method of claim 2, wherein the acquiring of the texture map comprises acquiring a texture map for an upper part of the set of teeth, and a texture map for a lower part of the set of teeth.

4. The method of claim 2, wherein the acquiring of the texture map further comprises acquiring a texture map for a gum adjacent to the teeth.

5. The method of claim 1, wherein the generating of the diffuse normal map comprises generating diffuse normal maps for each RGB channel using the virtual light stage.

6. The method of claim 1, wherein generating the hybrid normal map comprises generating the hybrid normal map using a gradient illumination light pattern, wherein the light pattern is adjusted in the virtual light stage.

7. A non-transitory computer readable recording medium storing a program to cause a computer to implement the method of claim 1.

8. An apparatus for realistically expressing a set of teeth, the apparatus comprising:
   a shape model acquiring module to acquire a shape model of the teeth;
   a map generating module to generate a hybrid normal map adjusting a light pattern in a virtual light stage, the hybrid normal map being used to represent materials and characteristics of the teeth, and the virtual light stage being used to represent optical characteristics on the shape model; and
   a rendering module to perform a rendering on the shape model based on the generated hybrid normal map,
   wherein the map generating module comprises:
   a diffuse normal map generator to generate a diffuse normal map using the virtual light stage, wherein the diffuse normal map is used to represent a diffuse reflection occurring in the shape model;
   a specular normal map generator to generate a specular normal map using the virtual light stage, wherein the specular normal map is used to represent a specular reflection occurring in the shape model; and
   a hybrid normal map generator to generate a hybrid normal map for the shape model, using the generated diffuse normal map and the generated specular normal map.

9. The apparatus of claim 8, further comprising:
   a texture map acquiring module to acquire a texture map for the teeth.

10. The apparatus of claim 9, wherein the texture map acquiring module acquires a texture map for an upper part of the set of teeth and a texture map for a lower part of the set of teeth.

11. The apparatus of claim 9, wherein the texture map acquiring module acquires a texture map for a gum adjacent to the teeth.

12. The apparatus of claim 8, wherein the diffuse normal map generator generates diffuse normal maps for each RGB channel using the virtual light stage.

13. The apparatus of claim 8, wherein the map generating module generates the hybrid normal map using a gradient illumination light pattern, wherein the light pattern is adjusted in the virtual light stage.

14. The apparatus of claim 8, wherein the characteristics of the teeth comprise at least one of an effect of different transparency levels, glittering, and shadows between teeth.

15. The apparatus of claim 8, wherein the optical characteristics on the shape model comprise at least one of interreflection, occlusion, and subsurface scattering.

16. A method for realistically expressing a set of teeth, the method comprising:

acquiring a shape model of the teeth; and generating, by a processor, a hybrid normal map adjusting a light pattern in a virtual light stage, wherein the hybrid normal map represents materials and characteristics of the teeth, and wherein the virtual light stage represents optical characteristics on the shape model, wherein the generating of the hybrid normal map comprises:

generating a diffuse normal map using the virtual light stage, wherein the diffuse normal map is used to represent a diffuse reflection occurring in the shape model;

generating a specular normal map using the virtual light stage, wherein the specular normal map is used to represent a specular reflection occurring in the shape model; and generating a hybrid normal map for the shape model, using the generated diffuse normal map and the generated specular normal map.

17. The method of claim 16, wherein the characteristics of the teeth comprise at least one of an effect of different transparency levels, glittering, and shadows between teeth.

18. The method of claim 16, wherein the optical characteristics on the shape model comprise at least one of interreflection, occlusion, and subsurface scattering.

* * * * *